United States Patent
Qi

(10) Patent No.: US 9,488,086 B2
(45) Date of Patent: Nov. 8, 2016

(54) LOW PRESSURE ATOMIZING INJECTOR

(71) Applicant: Baohua Qi, Marietta, GA (US)

(72) Inventor: Baohua Qi, Marietta, GA (US)

( * ) Notice: Subject to any disclaimer, the term of this patent is extended or adjusted under 35 U.S.C. 154(b) by 0 days.

(21) Appl. No.: 14/565,938

(22) Filed: Dec. 10, 2014

(65) Prior Publication Data
US 2015/0176462 A1    Jun. 25, 2015

Related U.S. Application Data

(60) Provisional application No. 61/920,424, filed on Dec. 23, 2013.

(51) Int. Cl.
  *F01N 3/00*  (2006.01)
  *F01N 3/20*  (2006.01)

(52) U.S. Cl.
  CPC ......... *F01N 3/2066* (2013.01); *F01N 2610/02* (2013.01); *F01N 2610/1453* (2013.01); *Y02T 10/24* (2013.01)

(58) Field of Classification Search
  None
  See application file for complete search history.

(56) References Cited

U.S. PATENT DOCUMENTS

| | | | | |
|---|---|---|---|---|
| 3,081,952 A | * | 3/1963 | Woodward | F23D 11/26 239/404 |
| 4,179,069 A | * | 12/1979 | Knapp | F02M 51/0678 239/125 |
| 4,662,567 A | * | 5/1987 | Knapp | F02M 51/0671 239/585.4 |
| 5,020,728 A | * | 6/1991 | Linder | F02M 61/08 239/453 |
| 5,035,358 A | * | 7/1991 | Katsuno | F02M 69/047 239/403 |
| 6,125,818 A | * | 10/2000 | Okamoto | F02M 51/0671 123/305 |
| 2010/0314470 A1 | * | 12/2010 | Cavanagh | B05B 1/3436 239/490 |
| 2015/0275723 A1 | * | 10/2015 | Koch | F02M 25/0718 60/605.2 |

* cited by examiner

*Primary Examiner* — Jesse Bogue

(57) ABSTRACT

An injector for delivering a working fluid into a working environment is disclosed. According to one embodiment of the present invention, the injector includes a pre-metering chamber and a swirl chamber. A high velocity partially atomized flow is produced in the pre-metering chamber through a first exit nozzle after impinging on an atomization element, and then a swirling flow is created in the swirl chamber with the atomization element. When the swirling flow is released through a second exit nozzle, atomization can be achieved at low injector pressure with centrifugal force and shearing of the working fluid. In another embodiment, the injector includes a swirl chamber and an atomization element with a bore, through which a control valve is positioned. The control valve forces a working fluid flow through the atomization element when the injector is energized to create a swirling flow. No flow-back is required for the injectors.

17 Claims, 7 Drawing Sheets

US 9,488,086 B2

LOW PRESSURE ATOMIZING INJECTOR

This present application claims priority from U.S. provisional application No. 61/920,424 having the same title as the present invention and filed on Dec. 23, 2013.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD OF THE INVENTION

The present invention relates to a working fluid injection device, and more specifically, to an injection device for controlling a flow rate of a working fluid and atomizing the working fluid.

BACKGROUND OF THE INVENTION

In an engine system, especially in a compression-ignition engine, such as a diesel engine, injectors are used in engine cylinders and exhaust gas processing systems. In both applications, the main functions of the injector include controlling a flow rate of a working fluid and atomizing the working fluid.

In applications of in-cylinder fuel injections, a variety of methods can be used for controlling flow rate. Among them, a pre-metering method, in which a fluid is metered and then injected, and a common-rail method, in which a flow rate of a fluid is controlled by adjusting opening time of an injector in a repeating cycle, are commonly used. Fuel atomization in these applications is normally achieved with high injection pressure.

In exhaust gas processing systems, however, injection pressure is limited. For example, in a DPF (Diesel Particulate Filter) system, especially in a DPF system of an engine with a common rail fuel system, to regenerate the DPF, an external doser can be used for delivering fuel into a combustion device, which normally includes a DOC or a fuel burner. In the external doser, typically a lifting pump in the engine fuel system, which is primarily used for delivering low pressure diesel fuel to high pressure pumps, is employed for providing fuel to an injector, though which fuel delivery rate is controlled. The lifting pressure is much lower than the in-cylinder injection pressure. In a SCR (Selective Catalytic Reduction) system, DEF (Diesel Exhaust Fluid), which is a 32.5% wt urea solution, needs to be delivered to exhaust gas to reduce NOx therein. Limited to penetration distance, cost, and device size, normally only low pressure pump (lower than 10 bars) are used in DEF delivery.

Though injection pressure is low, exhaust gas processing systems are sensitive to working fluid atomization. In a DPF system, poor atomization causes delay in fuel oxidation in catalyst and fuel carbonization (coking), which may block doser nozzles and deteriorate temperature control performance, while in a SCR system, large droplet of DEF lowers deNOx efficiency and increases chances of urea crystallization, which may block injectors, catalysts, and even exhaust passages.

To obtain good atomization at low injection pressure, a variety of technologies can be used. One of the most commonly used technologies is using compressed air to assist working fluid injection. In this technology, the working fluid metered by a metering pump or a metering injector is mixed with compressed air, and the result mixture is then delivered to exhaust gas. However, in the air-assisted technology, compressed air also goes into exhaust gas with the working fluid. The compressed air lowers exhaust temperature, which is critical to reactions in the exhaust gas processing system, resulting in evaporation issues, poor thermolysis, and higher energy cost, and evaporates working fluid in the mixer in which the working fluid mixes with the compressed air, causing deposit and crystallization therein. Additionally, compressed air in the mixer varies pressure drop across the injector when a metering injector is used, introducing errors in flow rate control.

Another technology is using an atomization means together with an injector, as disclosed in the U.S. Pat. No. 8,047,452, and U.S. Pat. No. 6,279,603, in which an atomization device is used for creating small DEF droplets. In this technology, the working fluid has to cycle through the injector downstream from a possible pressure sensor, sensing values obtained from which is used for compensating flow rate control. Cycling the working fluid through the injector carries heat away therefrom, however, heating working fluid may cause fluid quality issues, since some working fluid deteriorates at high temperature, for example, deterioration of DEF starts to accelerate at a temperature higher than 50° C., while working fluid cycling downstream from the pressure sensor causes variations in pressure difference across the injector nozzle undetected, resulting in errors in flow rate control.

To solve the problems mentioned above, a primary object of the present invention is to provide a working fluid injector with which a good atomization can be achieved at low injection pressure without using compressed air.

A further objective of the present invention is to provide a working fluid injector pressure drop across which can be detected accurately through a pressure sensor upstream, thereby accurate flow rate control can be obtained.

Another objective of the present invention is to provide a working fluid injector that is able to create self-spinning of working fluid droplets to decrease spray angle and penetration distance, and improve atomization at low injection pressure.

BRIEF SUMMARY OF THE INVENTION

The present invention provides a working fluid injector for controlling flow rate and atomizing the working fluid. In particular, the injector of the present invention is an enhanced flow controller and atomizer working at low injection pressure for applications with engines, such as natural gas engines, and gasoline engines, and exhaust gas processing systems, such as DPF systems, SCR systems, and LNT (Lean NOx Trap) systems.

According to one embodiment of the present invention, an injector with a pre-atomizing chamber and a swirl chamber is provided. In this injector, the pre-atomizing chamber is enclosed by an upper injector body with a first exit nozzle and an atomization element, which is used for creating a swirling flow in the swirl chamber. Through the first exit nozzle, a high flow velocity can be obtained at low injection pressure, and in the pre-atomizing chamber, the impingement of the working fluid on the atomization element further improves atomization performance. Through the pre-atomizing chamber and the atomization element, the working fluid then enters the swirl chamber and is further released to a working environment via a second exit nozzle on the bottom of the swirl chamber. In the injector, a flow-back is not necessary, while the injector can be fit in an adaptor, which may have coolant circling inside for carrying heat away. Without effects of the flow-back, a pressure sensor can be positioned upstream from the injector to accurately measure the injection pressure, and thereby flow rate control can be accurately compensated.

According to another embodiment of the present invention, an injector with a control valve positioned through an atomization element is provided. In the injector, a swirl chamber is enclosed by the atomization element and an injector body, and an exit nozzle is positioned at the bottom of the swirl chamber. At a closed position, i.e., when the injector is de-energized, a front end portion of the control valve is in contact with a valve seat at the bottom of the swirl chamber, blocking working fluid from flowing out. After the injector is energized, the control valve is lifted up, contacting the front end portion to a valve seat at the bottom of the atomization element, blocking working fluid from flowing through a bore in the atomization element, through which the control valve is positioned, and forcing working fluid entering the swirl chamber through swirling grooves of the atomization element. The result swirling flow is then released to a working environment through the exit nozzle. As the one according to the first embodiment of the present invention, this injector has no flow-back, and thereby flow rate can be controlled accurately with sensing values obtained from a pressure sensor positioned upstream from the injector.

The foregoing and other objects, features, and advantages will be apparent from the following more detailed description of the preferred embodiments of the invention, as illustrated in the accompanying drawings, in which like reference characters refer to the same parts throughout the different views. The drawings are not necessarily to scale, emphasis instead being placed upon illustrating the principles of the embodiments.

DETAILED DESCRIPTION OF THE INVENTION

Figure 1A:
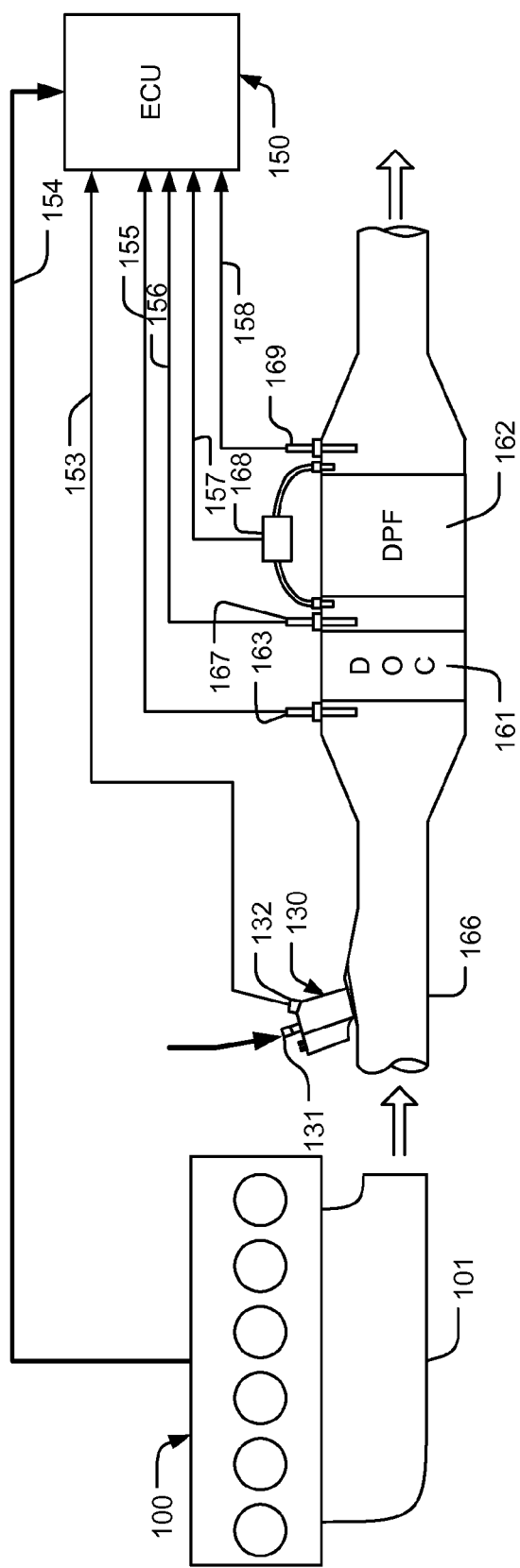
FIG. 1a is a schematic representation of a DPF control system with an external fuel injector.

Referring to FIG. 1a, in a diesel engine DPF system, an engine 100 with its exhaust manifold fluidly coupled to an exhaust passage 166, which is then fluidly connected to a catalyst package having a DOC 161 and a DPF 162 contained. A fuel injection device 130 with an injector 131 enclosed in an adaptor, which may have coolant cycling inside for carrying heat away, is used for providing fuel in regenerating the DPF, when the PM (Particulate Matter) collected therein is above a certain level. The injector 131 is controlled by an ECU (Engine Control Unit) 150 through signal lines 153 connected to a connection port 132, while sensing signals are obtained from the engine 100 by the ECU 150 through signal lines 154. Upstream from the DOC 161, a temperature sensor 163, which is electrically connected to the ECU 150 through signal lines 155, is used for measuring exhaust gas temperature at the inlet of the DOC 161, and temperature sensing signals obtained from two temperature sensors 169 and 167, which are positioned respectively downstream from the DPF 162, and in between the DOC 161 and the DPF 162, are sent to the ECU 150 through signal lines 158 and 156 respectively. To further detect pressure drop across the DPF 162, which is an indication of PM loading level in the DPF, two probes of a deltaP sensor 168, which is electrically linked to the ECU 150 through signal lines 157, are positioned upstream and downstream from the DPF 162.

In the exhaust gas processing system of FIG. 1a, a function of the DOC 161 is to oxidize fuel delivered by the injection device 130 for generating heat in regenerating the DPF 162, and other combustion devices, such as diesel fuel burners, can also be used for this purpose. To reliably and accurately control the DPF temperature, accurate fuel injection rate and small droplets are preferred, while typically, the injection rate is controlled by a flow rate controller, which can be achieved with the ECU 150, adjusting the energizing time of the injector 131 in a repeating cycle (e.g. with a PWM method), according to sensing values obtained from sensors 163, 167, 169, and 168, and sensors in the engine 100.

Figure 1B:
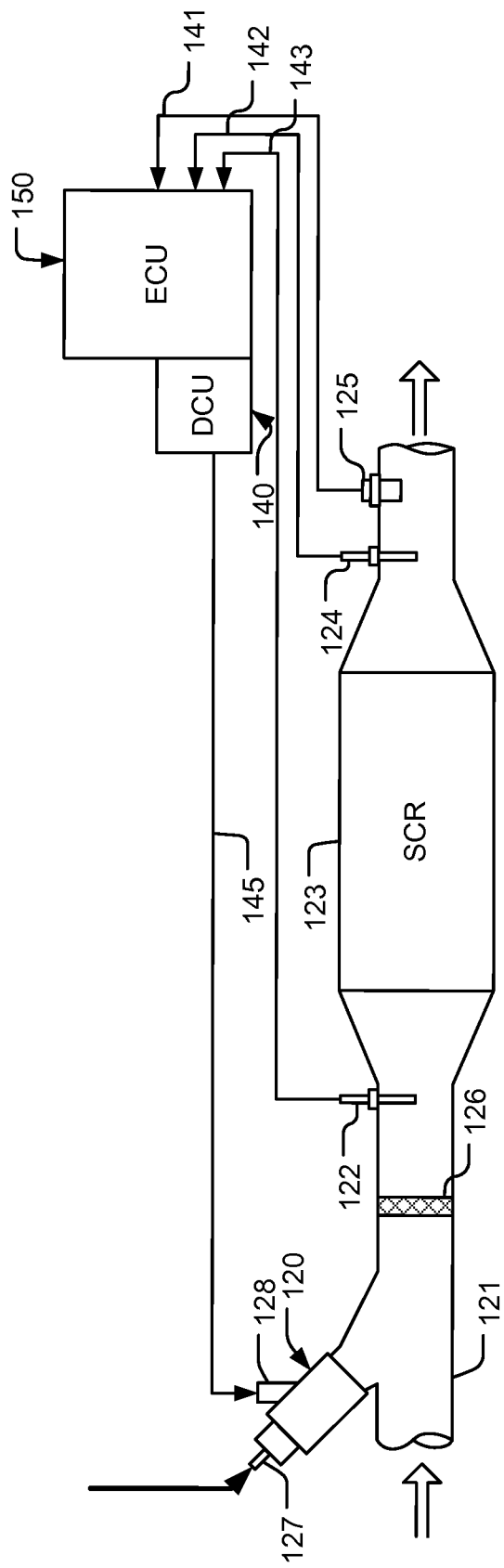
FIG. 1b is a schematic representation of a SCR control system with an airless DEF injector.

In engine exhaust gas processing systems, injectors are also used in delivering DEF in a SCR system. Referring to FIG. 1b, in an SCR system, a decomposition pipe 121 is fluidly connected to a SCR package 123, and an injection device 120 with an injector 127 enclosed in an adaptor, which may have coolant cycling inside, is installed on the decomposition pipe 121 for providing DEF to exhaust gas. The injector 127 is controlled by a DCU (Dosing Control Unit) 140 through signal lines 145 connected to a connection port 128, and downstream from the injection device 120, a mixer 126 is used for creating a uniform exhaust flow. Temperature sensors 122 and 124, which are positioned upstream and downstream of the SCR packages 123 respectively, are used by the ECU 150 for obtaining temperature sensing information through signal lines 143 and 142, while NOx concentration downstream from the SCR package 123 is measured by a NOx sensor 125, which communicates to the ECU 150 through signal lines 141.

In the SCR system of FIG. 1b, injection rate of DEF can be controlled through adjusting energizing time of the injection device 120 in a repeating cycle (e.g. with a PWM method), according to the temperature and NOx sensing values obtained from the sensors 122, 124 and 125. And as that in the DPF system of FIG. 1a, injection accuracy and droplet size are important performances of the injection device 120. To have high deNOx efficiency and low ammonia slip level, accurate DEF injection rate and small droplet size are required.

Figure 2A:
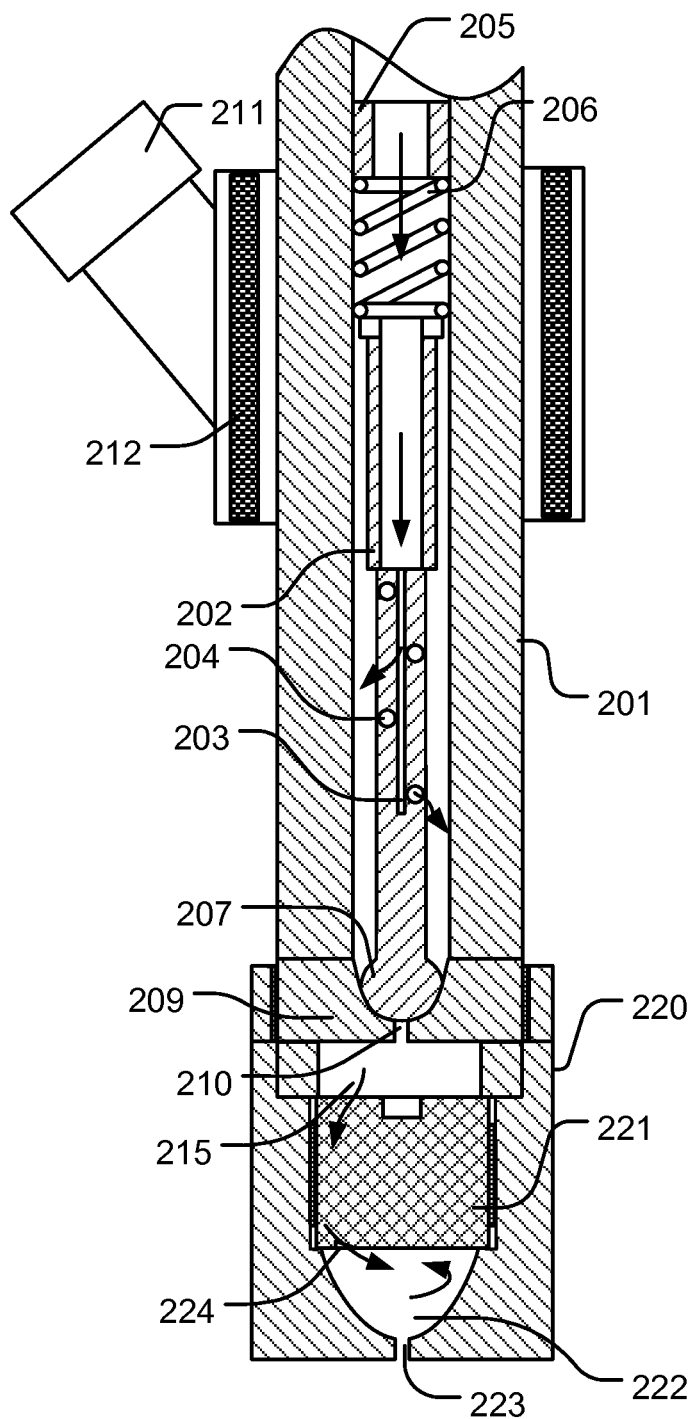
FIG. 2a depicts a cross sectional elevation view of a working fluid injector with a pre-metering chamber and a swirl chamber.

In accordance with an embodiment of the present invention, an atomization device is used with an injector for obtaining smaller droplet size. Referring to FIG. 2*a*, in a normally closed injector, an upper injector body 201 is connected to a lower injector body 220. In the upper injector body 201, a restoring spring 206 is positioned under a restraint sleeve 205, downward pressing a valve needle 202, which has a front end portion 207. At a closed position, the front end portion 207 contacts a valve seat 209 of the upper injector body 201, blocking fluid inside the upper injector body 201 from flowing out. On the bottom of the valve seat 209, a first exit nozzle 210, which may have multiple orifices, is fluidly connected to a pre-metering chamber 215, which is in between the valve seat 209 and an atomization element 221 enclosed by the lower injector body 220. In the bottom of the lower injector body 220, a swirl chamber 222 is formed under the atomization element 221, and a second exit nozzle 223 under the chamber 222 is used for releasing fluid. Outside the upper injector body 201, a solenoid coil 212, which has control signals applied through a connection port 211, is used for controlling the movement of the valve needle 202.

As shown in FIG. 2*a*, under pressure, a working fluid enters the upper injector body 201 through the constraint sleeve 205, the restoring spring 206, holes 204 on the valve needle 202, and grooves 203 on the valve needle 202. When a control voltage is applied on the solenoid 212, the needle valve 202 moves upward, forming a gap in between the front end portion 207 and the valve seat 209. The working fluid then enters the pre-metering chamber 215 through the gap and the first exit nozzle 210, and further enters the swirl chamber 222 via the atomization element 221. Through the second exit nozzle 223, the working fluid is released.

Figure 2B:
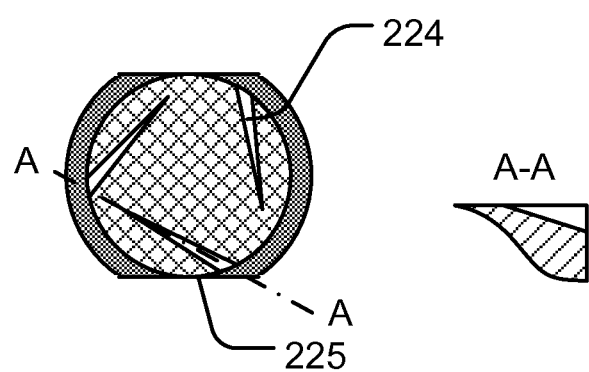
FIG. 2b shows a top view and a cross-sectional view of an atomization element in a working fluid injector with a pre-metering chamber and a swirl chamber.

In the injection device of FIG. 2*a*, the function of the atomization element 221 is to create a swirling flow for better atomization. A variety of atomization elements 221 can be used for this purpose, and an exemplary design is shown in FIG. 2*b*. In the atomization element 221 of FIG. 2*b*, two cutoff sides 225 form two passages with the lower injector body 220, allowing the working fluid to flow from the first chamber 215 to the second chamber 222. On the bottom surface of the atomization element 221, three swirling grooves 224 are used to guide the working fluid flow towards the swirl chamber 222, in which a swirl forms, and the swirling flow is sprayed out through the second exit nozzle 223, breaking into small droplets under centrifugal force and shearing of the working fluid by air.

In the injector of FIG. 2*a*, the function of the first exit nozzle 210 is to obtain higher flow velocity before the working fluid enters the swirl chamber 222. High flow velocity creates self-spinning droplets in the pre-metering chamber 215 when the working fluid flow impinges the upper surface of the atomization element 221 and fast swirling in the swirl chamber 222, resulting in small droplets and narrow spray angle. However, when the injector is de-energized off, since the working fluid is blocked at the nozzle 210, a residue could exist in the lower injector body 220, contacting the working environment through the second exit nozzle 223. To avoid issues caused by this working fluid residue, e.g., evaporation caused urea deposit after a long off time in a SCR system, after an injection process completes, it is ideal to have a purging process emptying the injector. In this purging process, the working fluid residue in the injector can be either drawn back to a working fluid tank through a reverting value, which controls fluid flowing directions, or sprayed into working environment with compressed air.

Figure 3A:
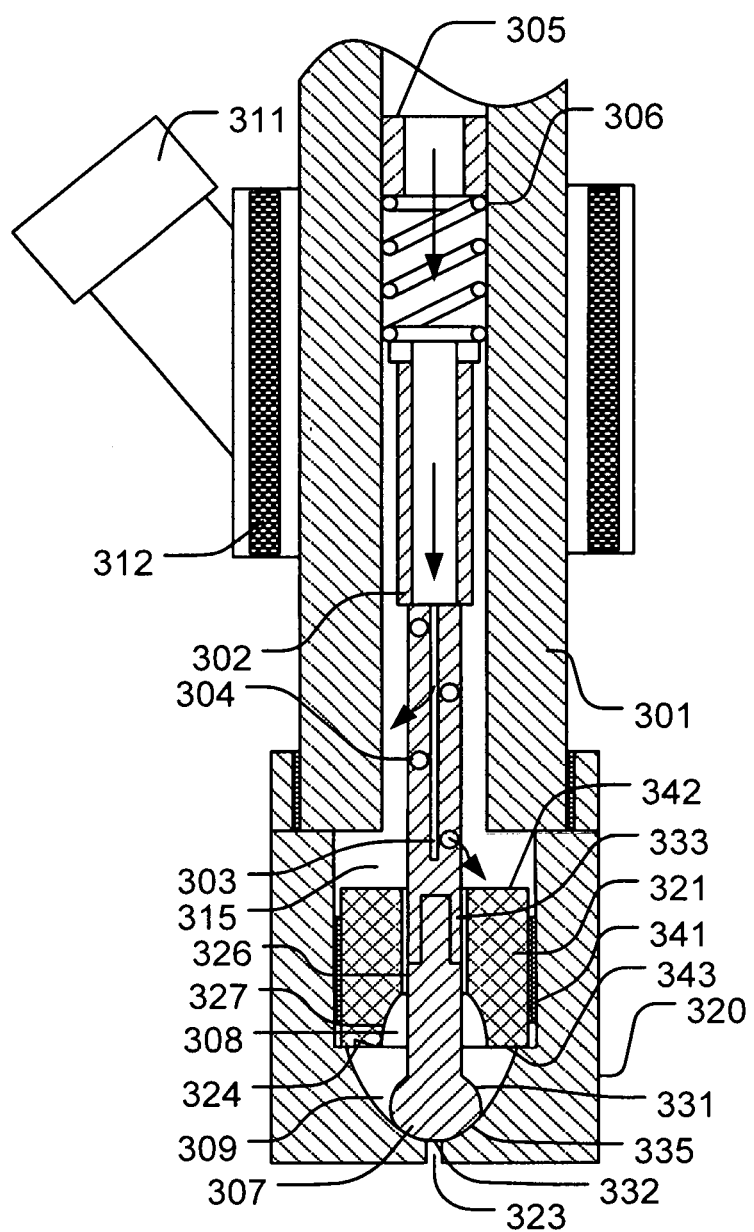
FIG. 3a depicts a cross sectional elevation view of a de-energized working fluid injector with a single swirl chamber.

The working fluid in the injector of FIG. 2*a* can also be blocked with a needle valve to keep it from directly contacting the working environment after the injector is de-energized off, Referring to FIG. 3*a*, in another embodiment of the present invention, an injector includes an upper injector body 301, and a lower injector body 320. A needle valve 302, which is positioned under a restoring spring 306 and a restraint sleeve 305, has a valve stem 333 and a front end portion 307 with a bottom surface 332 contacting a bottom inner face 335 of the lower injector body 320 when the injector is de-energized off, blocking the inside working fluid from contacting its working environment. In FIG. 3*a*, as that in FIG. 2*a*, the injector also has a solenoid coil 312 with control voltage applied through a connection port 311 for controlling the movement of the needle valve 302, while in the lower injector body 320, an atomization element 321, which has a bore 326 extended from a top end 342 to a receiving cavity 308 on a bottom end 343, is positioned around the needle valve 302. Referring to FIG. 3*c*, the atomization element 321 further has two cutoff sides 325 forming two passages 341 with the lower injector body 320, and on the bottom end 343 of the atomization element 321, three swirling grooves 324 are used to guides the working fluid.

Figure 3B:
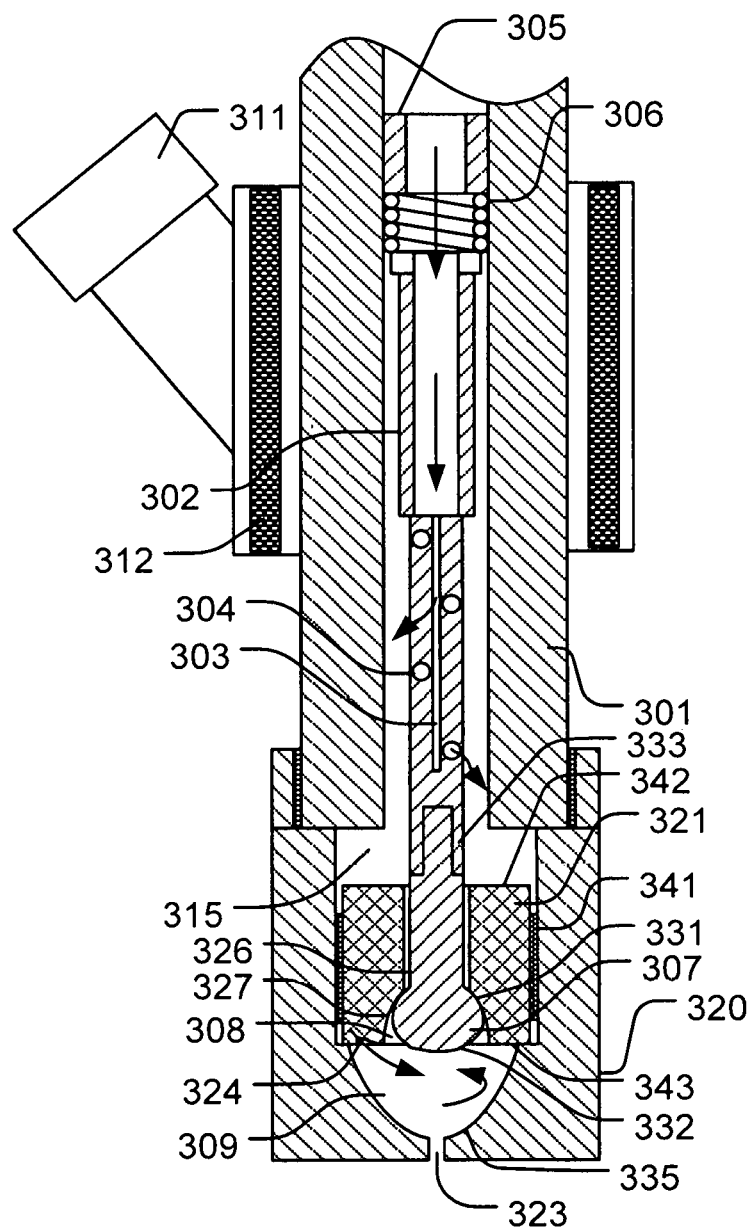
FIG. 3b depicts a cross sectional elevation view of an energized working fluid injector with a single swirl chamber.
Figure 3C:
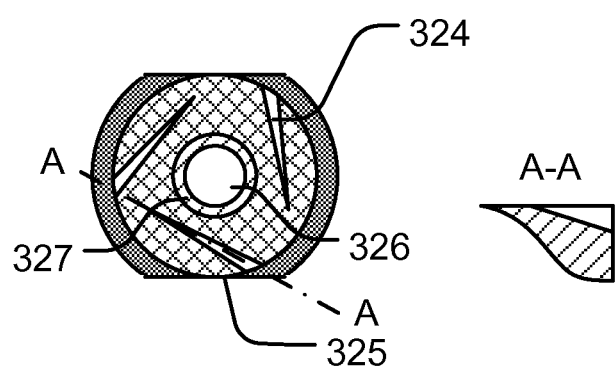
FIG. 3c shows a top view and a cross-sectional view of an atomization element in a working fluid injector with a single swirl chamber.

When the injector of FIG. 3*a* is energized, as shown in FIG. 3*b*, the needle valve 302 moves upward till the end portion 307 retracts into the receiving cavity 308 and an upper surface 331 of the front end portion 307 contacts a valve seat 327 in the receiving cavity 308. Under pressure, the working fluid enters the upper injector body 301 through the restraint sleeve 305, grooves 303 and holes 304 on the needle valve 302, and goes into a middle chamber 315 and further into a swirl chamber 309 enclosed by the atomization element 321 and the lower injector body 320. The front end portion 307 blocks the bore 326, forcing the working fluid to flow through the two passages 341 enclosed by the cutoff sides 325 and the lower injector body 320, and the swirling grooves 324, creating a swirl in the swirl chamber 309 thereby. The swirling flow then is sprayed out through an exit nozzle 323 on the bottom of the lower injector body 320.

Typically, to accurately control injection rate of the working fluid, a pressure compensation, in which a pressure inside an injector is used for compensating energizing time of the injector, is needed. And the pressure compensation requires small pressure drop inside the injector, since a pressure sensor normally is located upstream from the injector. To lower pressure drop, in the injector of FIG. 2*a*, the size of the second exit nozzle 223 should be much smaller than that of the first exit nozzle 210 and the effective cross section area of the two passages enclosed by the cutoff sides 225 and the lower injector body 220, while the injector of FIG. 3*a* should have a much smaller nozzle 323 compared to the effective cross section area of the two passages enclosed by the cutoff sides 325 and the lower injector body 320. Since in the injectors of FIG. 2*a* and FIG. 3*a*, there is no air assist means positioned downstream and flow-back nozzles, when pressure variation in the working environment and pressure drop in the injector are negligible compared to the pressure inside the injector, accurate pressure drop across the injection nozzles (e.g. the second exit nozzle 223 in FIG. 2*a* and the exit nozzle 323 in FIG. 3*a*) can be obtained with pressure sensing values obtained from a pressure sensor upstream from the injector, and thereby injection rate can be accurately compensated.

Although the apparatus and method of the invention are described herein in relation to the preferred embodiments shown in FIGS. 1a-3c, certain design alternations and modifications will become apparent to those of ordinary skill in the art upon reading this disclosure in connection with the accompanying drawings. It is intended, however, that the scope of the invention be limited only by the appended claims.

The invention claimed is:

1. An atomizing injector for delivering a working fluid into a working environment, comprising:
    an injector body having an fluid inlet and a fluid exit nozzle in contact with said working environment;
    an atomization element, which has a receiving cavity on its bottom end and a bore extended from said receiving cavity to its top end, enclosed in said injector body with said top end fluidly connected to said fluid inlet, creating a swirl chamber enclosed by said bottom end and said injector body, wherein said swirl chamber is in communication to said fluid exit nozzle; and
    a needle valve with a valve stem, which is movably disposed through said bore of said atomization element, and a front end portion connected to said valve stem and positioned in between said receiving cavity and said fluid exit nozzle, wherein said front end portion moves to a closed position, closing off a fluid flow path from said fluid inlet to said working environment when said atomizing injector is de-energized into a closed status, and retracts into said receiving cavity, blocking said working fluid from entering said swirl chamber therethrough when said atomizing injector is energized into an open status.

2. The atomizing injector of claim 1, wherein at least one fluid passage connecting said swirl chamber to said fluid inlet is enclosed by said atomization element and said injector body.

3. The atomizing injector of claim 1, wherein said atomization element further has a plurality of swirling grooves on said bottom end for guiding said working fluid flowing into said swirl chamber in creating a swirling flow.

4. The atomizing injector of claim 1, wherein said front end portion has an upper surface and a bottom surface.

5. The atomizing injector of claim 4, wherein said atomization element further has a valve seat in said receiving cavity, and said upper surface of said front end portion is in contact with said valve seat for blocking said working fluid from flowing into said receiving cavity through said bore after said front end portion has retracted into said receiving cavity.

6. The atomizing injector of claim 5, wherein said injector body has a bottom inner face inside in said swirl chamber around said fluid exit nozzle and said bottom surface of said front end portion is in contact with said bottom inner face for blocking said working fluid from flowing through said fluid exit nozzle after said front end portion has moved to said closed position.

7. The atomizing injector of claim 1, further comprising:
    a control solenoid coil for controlling a movement of said needle valve in said injector body.

8. The atomizing injector of claim 7, further comprising:
    a flow rate controller for controlling a flow rate of said working fluid configured to apply a pulse control signal to said control solenoid coil.

9. The atomizing injector of claim 1, wherein said working fluid is a urea solution.

10. An exhaust gas processing system of an internal combustion engine, comprising:
    a diesel particulate filter;
    a combustion device positioned upstream from said diesel particulate filter for regenerating said diesel particulate filter; and
    an atomizing injector delivering a fuel to said combustion device, including an injector body having an fluid inlet, a fluid exit nozzle, an atomization element, which has a receiving cavity on its bottom end and a bore extended from said receiving cavity to its top end, positioned in said injector body with said top end fluidly connected to said fluid inlet, creating a swirl chamber enclosed by said atomization element and said injector body, and a needle valve with a valve stem movably disposed through said bore of said atomization element and a front end portion connected to said valve stem and positioned in between said receiving cavity and said fluid exit nozzle, wherein said swirl chamber is in communication to said fluid exit nozzle, and said front end portion moves to a closed position, closing off a fuel flow path from said fluid inlet to said combustion device when said atomizing injector is de-energized into a closed status, and retracts into said receiving cavity, blocking said fuel from entering said swirl chamber therethrough when said atomizing injector is energized into an open status.

11. The exhaust gas processing system of claim 10, wherein said atomization element in said atomizing injector further has a plurality of swirling grooves on said bottom end for guiding said fuel flowing into said combustion device in creating a swirling flow.

12. The exhaust gas processing system of claim 10, wherein at least one fluid passage connecting said swirl chamber to said fluid inlet is enclosed by said atomization element and said injector body.

13. The exhaust gas processing system of claim 10, wherein said front end portion in said atomizing injector has an upper surface and a bottom surface.

14. The exhaust gas processing system of claim 13, wherein said atomization element in said atomizing injector further has a valve seat in said receiving cavity, and said upper surface of said front end portion is in contact with said valve seat for blocking said fuel from flowing into said receiving cavity through said bore after said front end portion has retracted into said receiving cavity.

15. The exhaust gas processing system of claim 14, wherein said injector body in said atomizing injector has a bottom inner face in said swirl chamber around said fluid exit nozzle and said bottom surface of said front end portion is in contact with said bottom inner face for blocking said fuel from flowing through said fluid exit nozzle after said front end portion has moved to said closed position.

16. The exhaust gas processing system of claim 10, wherein said atomizing injector further includes a control solenoid coil for controlling a movement of said needle valve in said injector body.

17. The exhaust gas processing system of claim 16, further comprising:
    a flow rate controller for controlling a flow rate of said fuel configured to apply a pulse control signal to said control solenoid coil.

* * * * *